Jan. 9, 1923.

H. FENNELL.

PROCESS OF MAKING BIFOCAL LENSES.

FILED NOV. 9, 1922.

1,441,566.

Inventor
Harry Fennell
By Stockbridge & Borst
Attorneys

Patented Jan. 9, 1923.

1,441,566

UNITED STATES PATENT OFFICE.

HARRY FENNELL, OF EVERETT, MASSACHUSETTS.

PROCESS OF MAKING BIFOCAL LENSES.

Application filed November 9, 1922. Serial No. 599,864.

*To all whom it may concern:*

Be it known that I, HARRY FENNELL, a citizen of the United States, residing at Everett, in the county of Middlesex and State of Massachusetts, have invented certain new and useful Improvements in Processes of Making Bifocal Lenses, of which the following is a full, clear, and exact description.

My invention relates to the manufacture of bifocal lenses, the same residing in a process or method of making a fused bifocal in which the reading segment of one kind of glass is enclosed within and protected by the body portion of a different kind of glass.

The object of the invention is to provide a simple, convenient and practical way of making a lens of this type or a blank for such lens.

My improved process consists in fusing into a recess in a block of glass of one index of refraction a disc of glass of a different index of refraction, and also fusing to said block outside said disc a layer of glass of the same index of refraction as said block.

It also consists in certain steps, features and details of procedure which will be hereinafter more fully described and claimed.

I have illustrated in the accompanying drawings the product of each of the different steps of the process, as I prefer to carry it out. It is to be understood, however, that my invention is not limited to any of the steps or details of the process illustrated and described, except as it may be limited by the appended claims. In these drawings:—

Figure 1:
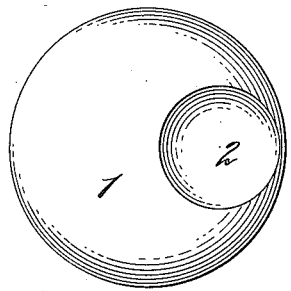
Figure 1 is a plan view of the block of glass which is to form the body portion of the lens or blank.
Figure 2:
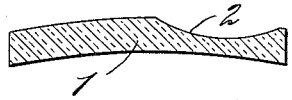
Figure 2 is a sectional view of the same.
Figure 4:
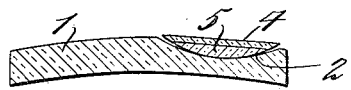
Figure 4 is a similar view of the elements of a lens blank just prior to fusing.
Figure 5:
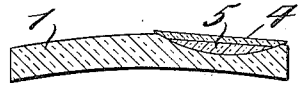
Figures 5 and 6 are similar views of a completed blank, Figure 6 showing in dotted lines where the blank may be ground for the production of a finished lens.

In carrying out my process, I form in a block 1 of glass of suitable contour, a spherical recess or depression 2 and fuse in said recess a button 3 composed of integral discs or laminæ 4 and 5 of glass of different indices of refraction. The disc or layer 4 should have the same index of refraction as the glass of the block 1; in practice it is made from what is commercially known as crown glass. The disc or layer 5 is made of glass of a different index of refraction from that of the disc 4 and block 1. It is preferably composed of what is known in the trade as flint glass,—that is, glass containing lead in its composition and having a relatively high index of refraction. The flint glass side of the button 3 has a convex curvature approximately the same as, but preferably slightly stronger than, that of the recess 2, as indicated in Figure 4 of the drawing. To fuse the parts together, the button 3 is placed in the recess 2, and the two parts of the lens are introduced into a suitable furnace and subjected to heat, so as to cause the fusion or coalescence of the two parts of the button 3 with the block 1 in the recess 2. The fusing operation may be substantially the same as that now followed in the production of the Kryptok bifocal. The product of the fusing operation is the lens blank represented in section in Figure 5 of the drawing. As will be seen, this blank consists of a body portion of crown glass, and a reading segment of flint glass enclosed within and protected by the body portion. All the parts are integrally united and the crown glass portion 4 of the button 3 forms a continuation of the crown glass body portion. It constitutes a covering web or layer of crown glass for the reading segment of flint glass and is preferably relatively thin.

Figure 6:
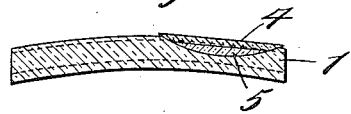
Figure 7:
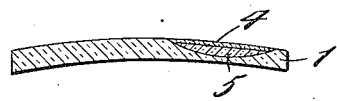
Figure 7 is a sectional view of a finished uncut lens.

To produce a finished lens from the blank, the usual procedure in the production of a lens from a Kryptok blank is followed. That is, both surfaces are ground to the curvatures desired and the lens cut to eye-size and edged. Care should be exercised, however, in the grinding and polishing of the segment side of the lens to remove but a portion of the crown glass cover disc 4. In Figure 6, I have illustrated a blank and shown in dotted lines approximately the amount of the cover layer 4 which may be removed. Of course, the thickness of this layer 4 is not essential, except that it should not be wholly removed at any one or more points. In other words, at least a film of the crown glass cover layer 4 should be permitted to remain for the protection of the flint glass reading segment. An uncut finished lens made in accordance with my invention is illustrated in Figure 7 of the drawing.

Figure 3:
Figure 3 is a sectional view of one form of the composite button employed.
Figure 8:
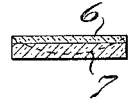
Figure 8 shows the elements of one of the composite buttons after they have been united but prior to grinding.

In the production of the composite button 3, shown in Figure 3, I take two flat, circular discs 6 and 7 of crown glass and flint glass, respectively, and fuse the same together by a separate preliminary fusing operation. The disc 6 is preferably about half the thickness of the disc 7. Convenient thicknesses for the two discs would be 1½ and 3 millimeters, respectively. When fused together, as illustrated in Figure 8 of the drawing, a segment blank is produced which is afterwards ground convex and polished upon the flint glass side thereof, as indicated in dotted lines in Figure 8, to form the button illustrated in Figure 3. The convex portion of the button 3 includes the entire exposed surface of the flint glass portion 5 thereof and the edge of the crown glass portion 4. When made the proper size, the button, including the crown glass portion thereof, may enter the recess 2 in the crown glass block 1, so that during the fusing operation the circumferential edge of the crown glass portion 4 of the button will become fused to the wall of the recess 2 around the periphery thereof.

Figure 9:
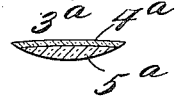
Figure 9 is a sectional view of a modified form of button.
Figure 10:
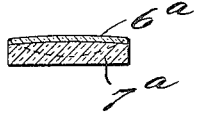
Figure 10 is a similar view of the elements of which the same is made.

Instead of employing a button 3 having the lower side of the crown glass portion 4 thereof plano, I may use a button 3ª, such as is illustrated in Figure 9, in which the crown glass portion 4ª is concaved on the side to which the flint glass portion 5ª is joined. In making such a button I first form a concave surface on one side of a disc 6ª of crown glass and fuse a disc 7ª of flint glass to said concave surface. The segment blank thus formed is afterwards ground convex on the flint glass side thereof, as indicated in dotted lines in Figure 10, and the button thereby produced may be fused into the recess 2 of the block 1 in the manner heretofore described. As the segment side of the periscopic lens of Figure 7 is convex it will be seen that by the use of the button 3ª in the production of such lens there is less danger of grinding away the crown glass layer 4ª to such an extent as to expose a part or all of the flint glass segment than there is when a button such as is illustrated in Figure 3 is employed.

While it is essential that the glass of the cover disc 4 be of the same index of refraction as that of the body portion 1, said disc may be made of colored glass or of glass having a different dispersive power from that of the body portion. For example, if the cover disc be made of Crookes or a similar glass, it would give relief to the eyes by filtering out some of the ultra-violet rays of light that ordinarily would pass unobstructed through the reading portion of the lens. And if made of glass having a different dispersive power from that of the body portion, the objection of chromatism present in the Kryptok bifocal may be overcome.

As the lens and lens blank produced in accordance with my improved process forms the subject of a separate application for patent filed by me February 23, 1922, Serial No. 538,502, a full detail description of the advantages of such a lens is not deemed necessary herein. It is sufficient to say that the lens thus produced has the reading segment of soft flint glass wholly protected by the body portion of crown glass, so that all danger of scratching or abrading the segment is avoided. The reading segment is also protected from deterioration by chemical action due to exposure to the atmosphere.

I claim:

1. The process of making a bifocal lens or blank which comprises fusing into a recess in a block of glass of one index of refraction a disc of glass of a different index of refraction and also fusing to said block outside said disc a layer of glass of the same index of refraction as said block.

2. The process of making a bifocal lens or blank which comprises fusing into a recess in a block of crown glass a disc of flint glass and also fusing a layer of crown glass to said block outside the disc of flint glass.

3. The process of making a bifocal lens blank which consists in fusing into a recess in a block of glass, in a single fusing operation, superposed discs of glass of different indices of refraction.

4. The process of making a bifocal lens blank which consists in fusing into a recess in a block of glass a button composed of superposed integral discs or laminæ of glass of different indices of refraction.

5. The process of making a bifocal lens blank which consists in fusing into a recess in a block of glass discs of glass of different indices of refraction, the outer of which is of the same index as that of said block.

6. The process of making a bifocal lens blank which consists in fusing into a recess in a block of glass a button composed of integral discs or laminæ of glass of different indices of refraction, the outer of which discs is of the same index of refraction as said block.

7. The process of making a bifocal lens blank which consists in fusing into a recess in a block of crown glass, superposed discs of flint and crown glass.

8. The process of making a bifocal lens blank which consists in fusing into a recess in a block of crown glass a button composed of integral discs or laminæ of flint and crown glass.

9. The process of making a bifocal lens blank which consists in fusing a disc of glass of a certain index of refraction into a recess in a block of glass of a different index of refraction, and simultaneously fusing into the same recess, on top of the first disc, a disc of glass of the same index as said block.

10. The process of making a bifocal lens blank which consists in fusing a disc of flint glass into a recess in a block of crown glass and simultaneously fusing a disc of crown glass into the same recess, on top of the disc of flint glass.

11. The process of making a bifocal lens blank which consists in fusing together two pieces of crown and flint glass, forming a convex surface on the flint glass side of the united pieces, and afterwards fusing the button thus formed into a recess in a block of crown glass.

12. The process of making a bifocal lens blank which consists in fusing together two discs composed respectively of crown and flint glass, forming a convex surface on the flint glass side of the united discs, and afterwards fusing the button thus formed into a recess in a block of crown glass.

13. The process of making a bifocal lens blank which consists in forming a concave surface on one side of a disc of crown glass, fusing a disc of flint glass to said concave surface, forming a convex surface on the flint glass side of the united discs and afterwards fusing the button thus formed into a recess in a block of crown glass.

In witness whereof, I hereunto subscribe my signature.

HARRY FENNELL.